US012344450B2

(12) United States Patent
Bastioli et al.

(10) Patent No.: US 12,344,450 B2
(45) Date of Patent: Jul. 1, 2025

(54) PACKAGING FILM

(71) Applicant: NOVAMONT S.P.A., Novara (IT)

(72) Inventors: Catia Bastioli, Novara (IT); Sebastià Gesti' Garcia, Turin (IT)

(73) Assignee: NOVAMONT S.P.A., Novara (IT)

( * ) Notice: Subject to any disclaimer, the term of this patent is extended or adjusted under 35 U.S.C. 154(b) by 177 days.

(21) Appl. No.: 17/632,982

(22) PCT Filed: Aug. 5, 2020

(86) PCT No.: PCT/EP2020/071976
§ 371 (c)(1),
(2) Date: Feb. 4, 2022

(87) PCT Pub. No.: WO2021/023763
PCT Pub. Date: Feb. 11, 2021

(65) Prior Publication Data
US 2022/0274751 A1 Sep. 1, 2022

(30) Foreign Application Priority Data

Aug. 6, 2019 (IT) .................. 102019000014154

(51) Int. Cl.
| B65D 65/42 | (2006.01) |
| B32B 27/08 | (2006.01) |
| B32B 27/36 | (2006.01) |
| B65D 65/40 | (2006.01) |
| B65D 65/46 | (2006.01) |
| C08J 5/18 | (2006.01) |
| C08J 7/04 | (2020.01) |
| C08J 7/048 | (2020.01) |
| C08L 67/04 | (2006.01) |
| C09D 103/02 | (2006.01) |

(52) U.S. Cl.
CPC .............. *B65D 65/42* (2013.01); *B32B 27/08* (2013.01); *B32B 27/36* (2013.01); *B65D 65/40* (2013.01); *B65D 65/466* (2013.01); *C08J 5/18* (2013.01); *C08J 7/0427* (2020.01); *C08J 7/048* (2020.01); *C08L 67/04* (2013.01); *C09D 103/02* (2013.01); *B32B 2250/02* (2013.01); *B32B 2250/244* (2013.01); *B32B 2255/10* (2013.01); *B32B 2255/205* (2013.01); *B32B 2255/26* (2013.01); *B32B 2255/28* (2013.01); *B32B 2270/00* (2013.01); *B32B 2307/414* (2013.01); *B32B 2307/538* (2013.01); *B32B 2307/54* (2013.01); *B32B 2307/7163* (2013.01); *B32B 2307/7244* (2013.01); *B32B 2307/7265* (2013.01); *B32B 2439/70* (2013.01); *C08J 2367/04* (2013.01); *C08J 2403/02* (2013.01); *C08J 2425/14* (2013.01); *C08J 2429/04* (2013.01); *C08J 2467/02* (2013.01); *C08L 2201/06* (2013.01); *C08L 2203/16* (2013.01); *C08L 2205/025* (2013.01); *C08L 2205/03* (2013.01); *C08L 2310/00* (2013.01); *C08L 2312/00* (2013.01)

(58) Field of Classification Search
CPC ..... C08L 67/04; C08L 2250/025; B32B 15/09
See application file for complete search history.

(56) References Cited

U.S. PATENT DOCUMENTS

| 2003/0135020 A1* | 7/2003 | Kobayashi ............... C08J 7/043 528/361 |
| 2014/0050934 A1* | 2/2014 | Siegenthaler ............ D21C 5/02 428/458 |
| 2014/0073745 A1 | 3/2014 | Bailey et al. |

FOREIGN PATENT DOCUMENTS

| JP | 2001026658 A | | 1/2001 | |
| JP | 2001310412 A | * | 11/2001 | |
| WO | WO 2011/123682 A1 | | 10/2011 | |
| WO | WO-2017182576 A1 | * | 10/2017 | ......... B29C 45/0001 |

OTHER PUBLICATIONS

Japanese Office Action and English translation issued on Mar. 7, 2023 for corresponding Japanese Application No. 2022-507666.

* cited by examiner

*Primary Examiner* — Yan Lan
(74) *Attorney, Agent, or Firm* — POLSINELLI PC

(57) ABSTRACT

The present invention relates to a film comprising at least one biodegradable layer (i) having an elastic modulus of more than 450 MPa, consisting of a mixture of polyhydroxyalkanoate constituting the continuous phase and aliphatic and/or aliphatic-aromatic polyester constituting the discontinuous phase, and at least one coating layer (ii) preferably capable of having barrier effects against gases and liquids. The surface of said layer (i) will have a root mean square roughness Sq of more than 10 nm and less than 45 nm, measured by atomic force microscopy (AFM). The film is particularly suitable for use in food packaging.

23 Claims, No Drawings

PACKAGING FILM

CROSS REFERENCE TO RELATED APPLICATIONS

This application is a National Phase filing under 35 U.S.C. § 371 of PCT/EP2020/071976 filed on Aug. 5, 2020; which application in turn claims priority to application No. 102019000014154 filed in Italy on Aug. 6, 2019. The entire contents of each application are hereby incorporated by reference.

DESCRIPTION

The present invention relates to a film that is particularly suitable for use in the manufacture of various types of packaging, in particular for primary food packaging, such as bags, films, lids.

The production of packaging requires the use of films with properties that ensure adequate processability and resistance to mechanical stress.

Good mechanical properties must also be associated, in particular in food packaging, with the ability to protect the contents from external agents and preserve foodstuffs satisfactorily to extend shelf life. These capabilities are mainly achieved by using films with a barrier effect against liquids and gases such as oxygen.

The choice of the material forming the basis of the film directly affects the permeability of the packaging, but in order to achieve adequate barrier properties, for example to water vapour and oxygen, packaging films can be subjected to specific treatments such as the application of a coating layer.

However the effectiveness of the barrier effect depends on adequate adhesion of the coating layer to the material constituting the film and is therefore influenced by the latter's surface properties.

Likewise, based on their surface properties, packaging films also respond to other surface treatments such as printing and decoration with greater or lesser efficiency.

In the packaging sector mechanical and barrier properties are now also associated with the need to use biodegradable materials that are able to degrade without causing the accumulation of waste in the environment once their primary use has been completed.

The biodegradable materials typically used for the production of films for food packaging are mainly based on polylactic acid, the rigidity and transparency of which cannot be achieved with other biodegradable materials. Document WO 2011/123682 A1, for instance, discloses a biaxially oriented packaging film made of PLA; in order to achieve a softer feel and quieter sound, the PLA film comprises a second polyester which, thanks to the biaxial orientation, forms an inner, stratified layer within the PLA-based layer.

Nevertheless polylactic acid has limitations associated with sub-optimal adhesion to surface coating treatments, with consequent impairment of the barrier effect of the finished packaging. For example, in some cases the use of adhesive resins such as acrylic and polyurethane resins is required, and these can compromise the total biodegradability of the packaging.

This means that manufacturers of biodegradable packaging films are faced with the problem of having to choose between using films with good mechanical and biodegradability properties and sub-optimal barrier properties or, conversely, enhancing the barrier properties of packaging by accepting lower performance in terms of mechanical properties and biodegradation.

There is therefore a need to develop a film capable of balancing these different requirements, characterised therefore by good biodegradation properties, good mechanical properties (in particular a high elastic modulus) and adequate barrier properties.

The present invention makes it possible to overcome the problems set out above. It has in fact been found that, surprisingly, a biodegradable film in which an aliphatic and/or aliphatic/aromatic polyester is dispersed in a continuous phase consisting of one or more polyhydroxyalkanoates in the presence of specific amounts of a crosslinking agent and/or a chain extending agent has adhesion characteristics that make it particularly suitable to undergo surface treatments such as coating treatments having a barrier effect against gases and liquids. A film having this composition and an elastic modulus of over 450 MPa can effectively be coupled with one or more coating layers and be suitable for use as packaging with a barrier effect, for example for food.

The object of the present invention is therefore a film comprising at least one biodegradable layer (i) with an elastic modulus of over 450 MPa, consisting of a mixture comprising a polyhydroxyalkanoate constituting the continuous phase and an aliphatic and/or aliphatic-aromatic polyester constituting the discontinuous phase, the said mixture further comprising from 0.01 to 5% wt. of a crosslinking agent and/or a chain extending agent having two or multiple functional groups, and at least one coating layer (ii) preferably capable of having gas and liquid barrier effects. The surface of said layer (i) has a root mean square roughness Sq of over 10 nm and less than 45 nm, measured by atomic force microscopy (AFM).

The invention also relates to the use of biodegradable films with a modulus of over 450 MPa consisting of a mixture comprising a polyhydroxyalkanoate as a continuous phase and at least one aliphatic and/or aliphatic-aromatic polyester as a discontinuous phase, for the preparation of packaging with a barrier effect.

According to one aspect, layer (i) of the film according to the invention comprises a mixture of preferably 10 to 49%, preferably 20 to 45% and more preferably 30 to 45% by weight of aliphatic and/or aliphatic/aromatic polyester and 90 to 51%, preferably 80 to 55% and more preferably 70 to 55% by weight of polyhydroxyalkanoate in relation to the total weight of the mixture.

Preferably said mixture consists of said aliphatic and/or aliphatic/aromatic polyester, said polyhydroxyalkanoate and optionally a cross-linking and/or chain-extending agent.

The packaging film according to the invention will be illustrated in more detail below, with reference to the individual layers (i) and (ii) making it up.

Layer (i)

As regards layer (i) of the film according to the invention, this consists of a mixture with a continuous phase including a polyhydroxyalkanoate.

This polyhydroxyalkanoate is preferably selected from the group consisting of lactic acid polyesters, polyhydroxybutyrate, polyhydroxybutyrate-valerate, polyhydroxybutyrate-propanoate, polyhydroxybutyrate-hexanoate, polyhydroxybutyrate-decanoate, polyhydroxy-butyrate-dodecanoate, polyhydroxybutyrate-hexadecanoate, polyhydroxybutyrate-octadecanoate, poly-3-hydroxybutyrate-4-hydroxybutyrate or mixtures thereof. Preferably the polyhydroxyalkanoate constituting the continuous phase comprises at least 70% by weight of one or more polyesters of lactic acid.

In a preferred embodiment said lactic acid polyesters are selected from the group consisting of poly L-lactic acid, poly D-lactic acid, poly D-lactic acid stereo complex, copolymers comprising more than 50% in moles of said lactic acid polyesters and mixtures thereof. Particularly preferred are lactic acid polyesters containing at least 95% by weight of repetitive units derived from L-lactic or D-lactic acid or combinations thereof, with a molecular weight Mw of more than 50000 and shear viscosity of between 50 and 700 Pa*s, preferably between 80 and 500 Pa*s (measured according to ASTM standard D3835 at T=190° C., shear rate=1000 $s^{-1}$, D=1 mm, L/D=10).

In a particularly preferred embodiment according to the invention the lactic acid polyester comprises at least 95% by weight of units derived from L-lactic acid, ≤5% of repetitive units derived from D-lactic acid, has a melting point in the range 135-175° C., a glass transition temperature (Tg) in the range 55-65° C. and an MFR (measured according to ISO 1133-1 at 190° C. and 2.16 kg) in the range 1-50 g/10 min. Commercial examples of lactic acid polyesters having these properties are the Ingeo™ Biopolymer products 4043D, 3251D and 6202D.

Film layer (i) according to the invention also comprises at least one aliphatic and/or aliphatic/aromatic polyester as a discontinuous phase, said aliphatic/aromatic polyester being preferred.

In the case of an aliphatic/aromatic polyester this preferably comprises:
(a) a dicarboxylic component comprising, in relation to the total dicarboxylic component:
  a1) 30-70% in moles, preferably 40-60% in moles, of units derived from at least one aromatic dicarboxylic acid;
  a2) 70-30% in moles, preferably 60-40% in moles, of units derived from at least one saturated aliphatic dicarboxylic acid;
  a3) 0-5% in moles of units derived from at least one unsaturated aliphatic dicarboxylic acid;
(b) a diol component comprising, in relation to the total of the diol component:
  b1) 95-100% in moles, preferably 97-100% in moles, of units derived from at least one saturated aliphatic diol;
  b2) 0-5% in moles, preferably 0-3% in moles, of units derived from at least one unsaturated aliphatic diol.

The aromatic dicarboxylic acids of component a1 are preferably selected from aromatic dicarboxylic acids of the phthalic acid type, preferably terephthalic acid or isophthalic acid, more preferably terephthalic acid, and heterocyclic dicarboxylic aromatic compounds, preferably 2,5-furandicarboxylic acid, 2,4-furandicarboxylic acid, 2,3-furandicarboxylic acid, 3,4-furandicarboxylic acid, more preferably 2,5-furandicarboxylic acid, their esters, salts and mixtures.

In a preferred embodiment, said aromatic dicarboxylic acids comprise:
  1 to 99% in moles, preferably 5 to 95% and more preferably 10 to 80%, of terephthalic acid, its esters or salts;
  99 to 1% in moles, preferably 95 to 5% and more preferably 90 to 20%, of 2,5-furandicarboxylic acid, its esters or salts.

The saturated aliphatic dicarboxylic acids of component a2 are preferably selected from $C_2$-$C_{24}$, preferably $C_4$-$C_{13}$, more preferably $C_4$-$C_{11}$ saturated dicarboxylic acids, their $C_1$-$C_{24}$ preferably $C_1$-$C_4$ alkyl esters, their salts and mixtures. Preferably the saturated aliphatic dicarboxylic acids are selected from succinic acid, 2-ethylsuccinic acid, glutaric acid, 2-methylglutaric acid, adipic acid, pimelic acid, suberic acid, azelaic acid, sebacic acid, undecanedioic acid, dodecanedioic acid, brassylic acid and their $C_1$-$C_{24}$ alkyl esters. In a preferred embodiment according to the invention the saturated aliphatic dicarboxylic acids comprise succinic acid, adipic acid, azelaic acid, sebacic acid and mixtures thereof.

The unsaturated aliphatic dicarboxylic acids of component a3 are preferably selected from itaconic acid, fumaric acid, 4-methylen-pimelic acid, 3,4-bis(methylene) nonanedioic acid, 5-methylen-nonanedioic acid, their $C_1$-$C_{24}$, preferably $C_1$-$C_4$, alkyl esters, their salts and mixtures. In a preferred embodiment according to the invention the unsaturated aliphatic dicarboxylic acids comprise mixtures comprising at least 50% in moles, preferably more than 60% in moles, and preferably more than 65% in moles of itaconic acid, its $C_1$-$C_{24}$, preferably $C_1$-$C_4$ esters. More preferably the unsaturated aliphatic dicarboxylic acids consist of itaconic acid.

As regards the saturated aliphatic diols of component b1, these are preferably selected from 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexanediethanol, neopentyl glycol, 2-methyl-1,3-propanediol, dianhydrosorbitol, dianhydromannitol, dianhydroiditol, cyclohexanediol, cyclohexanmethanediol, dialkylene glycols and polyalkylene glycols of molecular weight 100-4000 such as polyethylene glycol, polypropylene glycol and mixtures thereof. Preferably the diol component comprises at least 50% in moles one or more diols chosen from 1,2-ethanediol, 1,3-propanediol, 1,4-butanediol. More preferably, the diol component comprises, or consists of, 1,4-butanediol.

As regards the unsaturated aliphatic diols of components b2, these are preferably selected from cis-2-butene-1,4 diol, trans-2-butene-1,4-diol, 2-butyne-1,4 diol, cis-2-pentene-1, 5-diol, trans-2-pentene-1,5-diol, 2-pentyne-1,5-diol, cis-2-hexene-1,6-diol, trans-2-hexene-1,6-diol, 2-hexene-1,6-diol, cis-3-hexene-1,6-diol, trans-3-hexene-1,6-diol, 3-hexene-1, 6-diol.

In the case of an aliphatic polyester, this preferably comprises:
(c) a dicarboxylic component comprising, in relation to the total dicarboxylic component:
  (c1) 95-100% in moles of units derived from at least one aliphatic dicarboxylic acid;
  (c2) 0-5% in moles of units derived from at least one unsaturated aliphatic dicarboxylic acid;
(d) a diol component comprising, in relation to the total diol component:
  (d1) 95-100% in moles of units from at least one saturated aliphatic diol;
  (d2) 0-5% in moles of units from at least one unsaturated aliphatic diol.

The saturated aliphatic dicarboxylic acids of component c1 are preferably selected from saturated $C_2$-$C_{24}$, preferably $C_4$-$C_{13}$, more preferably $C_4$-$C_{11}$ dicarboxylic acids, their $C_1$-$C_{24}$, preferably $C_1$-$C_4$ alkyl esters, their salts and mixtures. Preferably the saturated aliphatic dicarboxylic acids are selected from succinic acid, 2-ethylsuccinic acid, glutaric acid, 2-methylglutaric acid, adipic acid, pimelic acid, suberic acid, azelaic acid, sebacic acid, undecanedioic acid, dodecanedioic acid, brassylic acid, hexadecanedioic acid, octadecanedioic acid and their $C_1$-$C_{24}$ alkyl esters.

The unsaturated aliphatic dicarboxylic acids of component c2 are preferably selected from itaconic acid, fumaric acid, 4-methyl-pimelic acid, 3,4-bis(methylene) nonanedioic acid, 5-methylene-nonanedioic acid, their $C_1$-$C_{24}$, preferably $C_1$-$C_4$, alkyl esters, their salts and mixtures. In a preferred embodiment according to the invention the unsaturated aliphatic dicarboxylic acids comprise mixtures comprising at least 50% in moles, preferably more than 60% in moles, preferably more than 65% in moles, of itaconic acid and its $C_1$-$C_{24}$, preferably $C_1$-$C_4$ esters. More preferably the unsaturated aliphatic dicarboxylic acids consist of itaconic acid.

As regards the aliphatic saturated diols of component d1, these are preferably selected from 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexandimethanol, neopentyl glycol, 2-methyl-1,3-propanediol, dianhydrosorbitol, dianhydromannitol, dianhydroiditol, cyclohexanediol, cyclohexanmethanediol, dialkylene glycol and polyalkylene glycols having a molecular weight of 100-4000, such as polyethylene glycol, polypropylene glycol and mixtures thereof. The diol component preferably comprises at least 50% in moles of one or more diols selected from 1,2-ethanediol, 1,3-propanediol, 1,4-butanediol. More preferably the diol component comprises or consists of 1,4-butanediol.

As regards the unsaturated aliphatic diols of component d2, these are preferably selected from cis-2-butene-1,4-diol, trans-2-butene-1,4-diol, 2-butyne-1,4-diol, cis-2-pentene-1,5-diol, trans-2-pentene-1,5-diol, 2-pentyne-1,5-diol, trans-2-hexene-1,6-diol, 2-hexene-1,6-diol, cis-3-hexene-1,6-diol, trans-3-hexene-1,6-diol.

In a particularly preferred embodiment the aliphatic and/or aliphatic/aromatic polyesters of layer (i) according to the present invention are selected from the group comprising poly(1,4-butylene succinate), poly(1,4-butylene succinate-co-adipate), poly(1,4-butylene succinato-co-1,4-butylene azelate), poly(1,4-butylene adipate-co-1,4-butylene terephthalate), poly(1,4-butylene succinate-co-1,4-butylene terephthalate), poly(1,4-butylene azelate-co-1,4-butylene terephthalate), poly(1,4-butylene brassylate-co-1,4-butyl ene terephthalate), poly(1,4-butylene sebacate-co-1,4-butylene terephthalate), poly(1,4-butylene adipate-co-1,4-butylene sebacate-co-1,4-butylene terephthalate), poly(1,4-butylene azelate-co-1,4-butylene sebacate-co-1,4-butylene terephthalate), poly(1,4-butylene adipate-co-1,4-butylene azelate-co-1,4-butylene terephthalate), poly(1,4-butylene succinate-co-1,4-butylene sebacate-co-1,4-butylene terephthalate), poly(1,4-butylene adipate-co-1,4-butylene succinate-co-1,4-butylene terephthalate), poly(1,4-butylene azelate-co-1,4-butylene succinate-co-1,4-butylene terephthalate).

The aliphatic and/or aliphatic/aromatic polyesters of layer (i) according to the present invention may also advantageously comprise repetitive units derived from at least one hydroxyacid in quantities between 0 and 49%, preferably between 0 and 30% in moles in relation to the total moles of the dicarboxylic component. Examples of convenient hydroxy acids are glycolic acid, hydroxybutyric acid, hydroxycaproic acid, hydroxyvaleric acid, 7-hydroxyheptanoic acid, 8-hydroxyheptanoic acid, 9-hydroxynonanoic acid, lactic acid or lactides. Hydroxyacids may be inserted in the chain as such or as prepolymers/oligomers, or they may also be reacted with diacids or diols in advance.

Long molecules having two functional groups, including non-terminal functional groups may also be added in quantities not exceeding 10% in moles in relation to the total moles of the dicarboxylic component. Examples are dimer acids, ricinoleic acid and acids having an epoxy functional group and also polyoxyethylene of molecular weight between 200 and 10000.

Diamines, amino acids or amino alcohols may also be present in percentages up to 30% in moles in relation to the total moles of the dicarboxylic component.

In the process of preparing the aliphatic and/or aliphatic/aromatic polyesters of layer (i) according to the present invention one or more molecules with multiple functional groups may also be advantageously added in quantities between 0.1 and 3% in moles in relation to the total moles of dicarboxylic component in order to obtain branched products. Examples of these molecules are glycerol, pentaerythritol, trimethylolpropane, citric acid, dipentaerythritol, monoanhydrosorbitol, monoanhydromannitol, acid triglycerides, polyglycerols, etc.

The molecular weight Mn of said aliphatic and/or aliphatic-aromatic polyester layer (i) is preferably ≥20000, more preferably ≥40000. As far as the polydispersity index of the molecular weights (Mw/Mn) is concerned, this is instead preferably between 1.5 and 10, more preferably between 1.6 and 5, and even more preferably between 1.8 and 2.7.

Molecular weights Mn and Mw can be measured using Gel Permeation Chromatography (GPC). The determination can be carried out with the chromatographic system held at 40° C., using a set of two columns in series (particle diameter of 5 µm and 3 µm with mixed porosity), a refractive index detector, chloroform as eluent (flow 0.5 ml/min) and polystyrene as the reference standard.

The Melt Flow Rate (MFR) of the aliphatic and/or aliphatic-aromatic polyesters of layer (i) is preferably between 500 and 1 g/10 min, more preferably between 100 and 3 g/10 min, even more preferably between 15 and 3 g/10 min (measurement made at 190° C./2.16 kg according to standard ISO 1133-1 "Plastics-determination of the melt mass-flow rate (MFR) and melt volume flow rate (MVR) of thermoplastics-Part 1: Standard method").

The content of terminal acid groups of said aliphatic and/or aliphatic-aromatic polyester layer (i) is preferably less than 100 meq/kg, preferably less than 60 meq/kg and even more preferably less than 40 meq/kg.

The content of terminal acid groups can be measured as follows: 1.5-3 g of polyester are placed in a 100 ml flask together with 60 ml of chloroform. After complete dissolution of the polyester, 25 ml of 2-propanol and, immediately before analysis, 1 ml of deionised water are added. The solution thus obtained is titrated with a previously standardised solution of NaOH in ethanol. An appropriate indicator, such as a glass electrode for acid-base titration in non-aqueous solvents, is used to determine the end point of the titration. The content of terminal acid groups is calculated from the consumption of NaOH solution in ethanol according to the following equation:

$$\text{Content of terminal acid groups (meq/kg polimer)} = \frac{[(Veq - Vb) - T] \cdot 1000}{P}$$

where: Veq=ml of NaOH solution in ethanol at the sample titration end point;

Vb=ml of NaOH solution in ethanol required to reach pH=9.5 during the blank titration;
T=concentration of NaOH solution in ethanol expressed in moles/litre;
P=weight of the sample in grams.

Preferably, said aliphatic and/or aliphatic/aromatic polyester of layer (i) has an inherent viscosity (measured with an Ubbelohde viscometer for solutions in $CHCl_3$ of concentration 0.2 g/dl at 25° C.) greater than 0.3 dl/g, preferably between 0.3 and 2 dl/g, more preferably between 0.4 and 1.1 dl/g.

Said aliphatic and/or aliphatic/aromatic polyester of layer (i) is biodegradable. For the purposes according to the invention a biodegradable polymer means a biodegradable polymer according to EN 13432.

Said aliphatic and/or aliphatic/aromatic polyester of layer (i) can be synthesised according to any of the processes known in the state of the art. In particular it can advantageously be obtained by a polycondensation reaction.

The synthesis process can advantageously be conducted in the presence of a suitable catalyst. Examples of suitable catalysts comprise organometallic tin compounds such as stannoic acid derivatives, titanium compounds such as orthobutyl titanate, aluminium compounds such as A1-tri-isopropyl, compounds of Antimony and Zinc and Zirconium, and mixtures thereof. Examples of synthesis processes that can be advantageously used for preparation of the polyesters are described in international patent application WO 2016/050963.

Film layer (i) according to the invention comprise 0.01-5% by weight, preferably 0.01-4% by weight, more preferably 0.05-4% by weight, even more preferably 0.1-3% by weight of the total mixture of at least crosslinking and/or chain extending agent.

Said cross-linking and/or chain-extending agent according to the invention is selected from compounds having two or multiple functional groups including isocyanate, peroxide, carbodiimide, isocyanurate, oxazoline, epoxy, anhydride or divinyl ether groups and mixtures of these.

According to a preferred aspect of the invention, the biodegradable film layer (i) according to the invention comprises from 0.01 to 0.45% by weight, with respect to the total mixture, of a crosslinking agent and/or a chain extending agent having two or multiple functional groups. According to this aspect, said crosslinking agent and/or a chain extending agent having two or multiple functional groups preferably bears peroxide or epoxy groups.

Said cross-linking and/or chain-extending agent, preferably bearing peroxide or epoxy groups, improves the rheology of the mixture constituting layer (i) and influences its surface characteristics. These compounds having two or multiple functional groups, preferably bearing peroxide or epoxy groups, are contained in the film layer (i) in amounts preferably below 0.4% by weight, more preferably of 0.35% or below, even more preferably of 0.3% by weight or below.

As regards the compounds having two or multiple functional groups bearing peroxide groups, these are preferably selected from benzoyl peroxide, lauroyl peroxide, isononanoyl peroxide, di-(t-butylperoxyisopropyl)benzene, t-butyl peroxide, dicumyl peroxide, alpha,alpha-di(t-butylperoxy)diisopropylbenzene, 2,5-dimethyl-2,5-di(t-butylperoxy)hexane, t-butyl cumyl peroxide, di-t-butyl peroxide, 2,5-dimethyl-2,5-di(t-butylperoxy)hex-3-yne, di(4-t-butyl cyclohexyl)peroxydicarbonate, dicetyl peroxydicarbonate, dimyristyl peroxydicarbonate, 3,6,9-trimethyl-3,6,9-trimethyl-1,4,7-triperoxonane, di(2-ethylhexyl) peroxydicarbonate and mixtures thereof.

According to an aspect, these compounds having two or multiple functional groups bear peroxide groups and are preferably contained in the film layer (i) in amounts from 0.01 to 0.1% by weight of the total mixture constituting layer (i), more preferably from 0.01 to 0.05% by weight.

The radical mechanism of action of these compounds having peroxide group could lead to the formation of gels into the polymer matrix.

Compounds bearing epoxy groups are preferred since they minimize the gel formation.

Examples of compounds having two or multiple functional groups bearing epoxy groups that can be advantageously used in the mixture according to the present invention are all the polyepoxides from epoxidised oils and/or styrene-glycidylether-methyl methacrylate and/or glycidyl ether methyl methacrylate, preferably within a range of molecular weights between 1000 and 10000 and with a number of epoxides per molecule in the range from 1 to 30 and preferably between 5 and 25. The epoxides are chosen from the group comprising: diethylene glycol diglycidyl ether, polyethylene glycol diglycidyl ether, polyglycidyl ether glycerol, polyglycidyl ether diglycerol, 1,2-epoxybutane, polyglycidyl ether polyglycerol, isoprene diepoxide, and cycloaliphatic epoxide, 1,4-cyclohexandimethanol diglycidyl ether, 2-methylphenyl ether glycidyl 2-methylphenyl ether, propoxylated glycerol, 1,4-butanediol diglycidyl ether, polyglycidyl sorbitol, glycerol diglycidyl ether, tetraglycidyl meta-xylenediamine ether and bisphenol A-glycidyl ether and mixtures thereof.

According to a preferred embodiment, these compounds having two or multiple functional groups bear epoxy groups and are contained in the film layer (i) in amounts from 0.05 to 0.3% by weight of the total mixture constituting layer (i), more preferably from 0.1 to 0.3% by weight.

According to an aspect of the invention, said cross-linking and/or chain-extending agent further improves stability to hydrolysis and comprises compounds having two or multiple functional groups bearing carbodiimide groups. The compounds having two or multiple functional groups bearing carbodiimide groups which are preferably used in the mixture according to the present invention are chosen from poly(cyclo-octylene carbodiimide), poly(1,4-dimethylene-cyclohexylene carbodiimide), poly(cyclohexylene carbodiimide), poly(ethylene carbodiimide), poly(butylene carbodiimide), poly(isobutylene carbodiimide), poly(nonylene carbodiimide), poly(dodecylene carbodiimide), poly(neopentylene carbodiimide), poly(1,4-dimethylene phenylene carbodiimide), poly(2,2',6,6'-tetraisopropyldiphenylene carbodiimide) (Stabaxol® (D), poly(2,4,6-triisopropyl-1,3-phenylene carbodiimide) (Stabaxol® P-100), poly(2,6 diisopropyl-1,3-phenylene carbodiimide) (Stabaxol® P), poly (tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), poly(naphthylene carbodiimide), poly(isophorone carbodiimide), poly(cumene carbodiimide), p-phenylene bis(ethylcarbodiimide), 1,6-hexamethylene bis(ethylcarbodiimide), 1,8-octamethylene bis(ethylcarbodiimide), 1,10-decamethylene bis(ethylcarbodiimide), 1,12-dodecamethylene bis(ethylcarbodiimide) and mixtures thereof.

According to an aspect, the crosslinking and/or chain extending agent comprises at least one compound having two or multiple functional groups containing isocyanate groups. More preferably, the cross-linking and/or chain-extending agent comprises at least 25% by weight of one or more compounds having two or multiple functional groups containing isocyanate groups. Particularly preferred are mixtures of compounds having two or multiple functional groups bearing isocyanate groups with compounds having two or multiple functional groups containing epoxy groups, and even more preferably including at least 75% by weight of compounds having two or multiple functional groups bearing isocyanate groups.

The compounds having two or multiple functional groups containing isocyanate groups are preferably selected from p-phenylene diisocyanate, 2,4-toluene diisocyanate, 2,6-toluene diisocyanate, 4,4-diphenylmethane-diisocyanate, 1,3-phenylene-4-chloro diisocyanate, 1,5-naphthalene diisocyanate, 4,4-diphenylene diisocyanate, 3,3'-dimethyl-4,4'-diphenylmethane diisocyanate, 3-methyl-4,4'-diphenylmethane diisocyanate, diphenyl ester diisocyanate, 2,4-cyclohexane diisocyanate, 2,3-cyclohexane diisocyanate, 1-methyl-2,4-cyclohexyl diisocyanate, 1-methyl-2,6-cyclohexyl diisocyanate, bis-(cyclohexyl isocyanate) methane, 2,4,6-toluene triisocyanate, 2,4,4-diphenylether triisocyanate, polymethylene-polyphenyl-polyisocyanates, methylene diphenyl diisocyanate, triphenylmethane triisocyanate, 3,3'-ditolylene-4,4-diisocyanate, 4,4'-methylene-bis-(2-methylphenyl isocyanate), hexamethylene diisocyanate, 1,3-cyclohexylene diisocyanate, 1,2-cyclohexylene diisocyanate and mixtures thereof. In a preferred embodiment the compound containing isocyanate groups is 4,4-diphenylmethane-diisocyanate.

In a preferred embodiment of the invention the crosslinking and/or chain extending agent present in the mixture constituting layer (i) comprises compounds bearing peroxy groups and/or bearing epoxy groups, preferably of the styrene-glycidylether-methyl methacrylate type, and/or bearing isocyanate groups, preferably 4,4-diphenylmethane-diisocyanate, and/or bearing carbodiimide groups.

In a particularly preferred embodiment of the invention, the crosslinking and/or chain extending agent comprises compounds containing epoxy groups of the styrene-glycidylether-methylmethacrylate type.

Together with the compounds having two or multiple functional groups bearing isocyanate, peroxide, carbodiimide, isocyanurate, oxazoline, epoxy, anhydride or divinyl ether groups, catalysts may also be used to increase the reactivity of the reactive groups. In the case of polyepoxides, salts of fatty acids are preferably used, even more preferably calcium and zinc stearates.

The mixture constituting film layer (i) according to the present invention also optionally contains one or more additives selected from the group comprising plasticizers, UV stabilizers, lubricants, nucleating agents, surfactants, antistatic agents, pigments, lignin, organic acids, antioxidants, anti-mould agents, waxes, process aids and polymer components preferably selected from the group comprising vinyl polymers and diacid-diol polyesters other than the aliphatic and/or aliphatic/aromatic polyesters described above.

Each additive is present in quantities preferably less than 10% by weight, more preferably less than 5% by weight, even more preferably less than 1% by weight of the total weight of the mixture.

One of the advantages according to the invention is represented by the remarkable processability properties of the mixture constituting layer (i) in comparison with conventional materials, as a result of which easy film-forming is possible even without the aid of additives and process aids such as slip and/or release agents.

Slip and/or release agents are e.g. biodegradable fatty acid amides such as oleamide, erucamide, ethylene-bis-stearylamide, fatty acid esters such as glycerol oleates or glycerol stearates, saponified fatty acids such as stearates, inorganic agents such as silica or talc. Among the slip and/or release agents, silica is preferred.

According to one advantageous aspect, the mixture of layer (i) has a slip and/or release agent content of less than or equal to 0.5% by weight, preferably less than or equal to 0.3% by weight and more preferably less than or equal to 0.1% by weight relative to the weight of the mixture. Even more preferably, there is no slip and/or release agent. This makes it possible to limit the phenomenon of the migration of additives to the surface, which could alter adhesion properties. According to a preferred aspect, the mixture of layer (i) according to the invention has an MFR value from 20 to 1 g/10 min, more preferably from 17 to 1.5 g/10 min, even more preferably from 14 to 2 g/10 min (measurement made at 190° C./2.16 kg according to ISO 1133-1 mentioned above).

Film layer (i) according to the invention can advantageously be obtained by film-forming processes, preferably bubble film-forming, or cast extrusion processes. The bubble film-forming process is preferably characterized by blow-up ratio (BUR or transversal stretching) values from 2 to 5, and drawdown ratio (DDR or longitudinal stretching) values in the machine direction (MD) from 5 to 60. For the purposes of this invention, DDR is defined as the measurement of the elongation of the molten material extruded from the extruder in the direction of drawing; BUR is defined as the ratio of the bubble diameter to the die diameter. Advantageously, during blown bubble blowing the process parameters are set so that the DDR/BUR values have a ratio from 1.5 to 18, preferably from 2.5 to 10.

The film layer (i) is preferably a bubble-blown film.

After its production, the film layer (i) is preferably not subjected to any further stretching process, either discontinuously or in line with the film-forming process. The said stretching process may in fact affect the evenness of the film and consequently of the coating layer, thus decreasing the barrier effect.

According to an aspect of the invention, the film layer (i) is a film mainly oriented in one direction, i.e. its molecular chains are mainly oriented in one direction (typically in the machine direction).

Film layer (i) according to the invention can also be subjected to one or more treatments to increase the final performance of the packaging.

Layer (i) may also undergo activation treatments (e.g. treatments to increase surface tension such as plasma treatment, corona treatment or priming treatments) to increase adhesion of the coating layer (ii) and to prevent delamination.

However one of the main advantages according to the invention lies precisely in the surface characteristics of layer (i), which make it possible to achieve effective adhesion even with mild treatments or in the absence of such activation treatments.

In fact, the surface of layer (i) according to the invention surprisingly has a roughness greater than PLA films in common use. In the art, roughness is considered to have a negative impact on the adhesion of the coating layer and consequently on the barrier effect of the film. Notwithstanding, the film of the invention having a peculiar range of roughness has shown a high degree of adhesion even without the need of adhesive layers. In particular the root mean square roughness (Sq) measured by atomic force microscopy (AFM) on an area of 10 µm×10 µm is advantageously above 10 nm, preferably above 15 nm, more preferably above 20 nm, and even more preferably above 40 nm and advantageously of 45 nm or below, of 35 nm or below and preferably of 30 nm or below. The preferred ranges are 10-45 nm and the most preferred are 15-30 nm. This measurement is obtained for example by operating in tapping mode with a resolution of 256 points by 256 lines, using a monolithic silicon microlever (cantilever) with a length of 225 microns, with a natural frequency of 190 kHz, force constant 48 N/m, tip radius less than 10 nm.

This root mean square roughness value Sq is calculated as the square root of the mean square of the actual profile deviations from the mean line, according to the formula below:

$$Sq = \sqrt{\left(\frac{1}{N}\sum_{i=1}^{N} r^2\right)}$$

where N is the total number of acquisitions in the area considered (e.g. 10 µm×10 µm) and r is the deviation of the real profile from the mean line in each acquisition.

Unlike mean roughness, the value of Sq is therefore also influenced by the amplitude of the peaks and troughs detected by the instrument on the measured surface, making it possible to distinguish between surfaces that are to a greater or lesser extent wavy.

It is felt that the characteristic undulation of layer (i) according to the invention has the effect of facilitating adhesion of the coating layer (ii). When AFM analysis is carried out under the conditions described above, this surface also shows a Sy difference between maximum profile height (maximum peak) and maximum profile trough depth (maximum trough) in comparison with the mean line of typically more than 90 nm, advantageously more than 95 nm, preferably more than 100 nm, more preferably more than 150 nm and even more preferably more than 200 nm. Advantageously, Sy values are of 300 nm or below, preferably of 280 nm or below. The thickness of layer (i) is advantageously less than 120 µm, more advantageously less than 80 µm, preferably less than 50 µm and more preferably less than or equal to 30 µm. The thickness of the layer can be measured by any suitable technique such as a micrometer or electron microscope.

The films according to the present invention find application in the manufacture of packaging, also because of the optimum mechanical properties of layer (i).

In particular, the film obtained with the mixture constituting layer (i) of the invention advantageously has elongation at break (εb) values below 400%, preferably below 350%, measured according to ASTM D882 (23° C., 50% relative humidity with Vo 50 mm/min). Such a film obtained with the mixture forming layer (i) according to the invention advantageously has elongation at break (εb) values of over 150% measured according to ASTM D882 (23° C., 50% relative humidity at Vo 50 mm/min).

Also, the film obtained with the mixture constituting layer (i) according to the invention advantageously has elastic modulus (E) values above 450 MPa, preferably above 500 MPa and more preferably above 1000 MPa measured according to ASTM D882 (23° C., 50% relative humidity with Vo 50 mm/min). According to a particularly advantageous aspect, layer (i) according to the invention has elastic modulus (E) values over 1500 MPa and preferably over 1700 MPa.

Advantageously, the mixture forming film layer (i) according to the invention is biodegradable. For the purposes according to the invention, "biodegradable" means biodegradable according to EN 13432.

Layer (i) of the rigid film according to the invention may be transparent or non-transparent. With regard to optical properties, according to a preferred embodiment the film according to the invention has transmittance values above 80%, more preferably above 90%, Haze values below 65%, more preferably below 55%, and clarity above 20%, more preferably above 40% (measured according to ASTM standard D1003).

Layer (ii)

The barrier film according to the invention comprises at least one coating layer (ii) adjacent to layer (i) and preferably capable of having barrier effects against gases and liquids, including water vapour.

This coating layer (ii) may comprise inorganic materials (e.g. metal alkoxides, silicon oxides) or organic materials (e.g. polymers and biopolymers of a protein and/or polysaccharide nature or lipid-based), possibly in combination to form mixtures or overlapping layers.

According to one embodiment of the invention this coating layer (ii) consists of one or more inorganic materials.

Among the inorganic materials, metals and their oxides and alkoxides, such as silver, copper, gold, aluminium, aluminium oxide, titanium oxide and/or aluminium-titanium oxide, silicon dioxide, Zn oxide, may be used.

According to another embodiment of the invention this coating layer (ii) consists of one or more organic materials.

Among the organic materials, natural substances such as cellulose in different forms may be used (e.g., in nanocrystalline form -NCC- or nanofibrillated form -NFC-) and their derivatives, chitosan, chitin, pectin, gluten, casein, zein, starch in different forms and its derivatives, gelatin, whey protein, carrageenan, guar gum, xanthan gum, alginate, and synthetic polymers such as polyvinyl alcohol, polyvinyl acetate, ethylene vinyl acetate, acrylates, polyamides, polyvinyl chlorides, organosilanes or polyethylene glycol. Among the synthetic polymers, polyvinyl alcohol, ethylene vinyl alcohol and polyvinyl alcohol-based polymers, with different degrees of hydrolysis, are preferred. Particularly preferred synthetic polymers are selected from polyvinyl alcohol, ethylene-vinyl alcohol and their copolymers; even more preferred is polyvinyl alcohol with a degree of hydrolysis advantageously between 70-100%.

The coating layer (ii) can further comprise fillers such as zeolites, graphene, graphene oxide or zirconium phosphate, with the aim of improving the performance of the final barrier. According to another embodiment of the invention this coating layer (ii) consists of one or more organic materials and one or more inorganic materials in combination.

According to this embodiment, said coating layer (ii) preferably comprises a first layer of organic material, which may be natural and/or synthetic, in contact with layer (i) and a second layer of metal material covering the first. This configuration of layer (ii) has the advantage of enhancing the barrier effect.

Preferably said coating layer (ii) of the barrier film according to the invention comprises one or more materials selected from: metals and their oxides and alkoxides, cellulose and its derivatives, starch and its derivatives, chitosan, synthetic polymers (such as polyvinyl alcohol, ethylene vinyl alcohol, polyvinyl acetate, ethylene vinyl acetate, acrylates, organosilanes, polyethylene glycol) and combinations thereof.

The term starch covers all types of starch, in particular the following: flour, native starch, hydrolysed starch, destructured starch, gelatinised starch, plasticised starch, thermoplastic starch, biofillers including complexed starch or mixtures of these. Starches capable of being easily destructured and having high initial molecular weights, such as potato and corn starch, are particularly advantageous. Starch and cellulose may be present both as such and in chemically modified form, e.g. in the form of starch or cellulose esters with a degree of substitution preferably between 0.2 and 2.5, hydroxypropylated starch, starch modified with fatty chains, or cellophane.

By destructured starch we refer here to the teachings contained in Patents EP 0 118 240 and EP 0 327 505, meaning as such starch processed in such a way that it does not substantially present the so-called "maltese crosses" under a polarised light microscope and the so-called "ghosts" under a phase contrast light microscope.

Starch destructuring is advantageously carried out by means of an extrusion process at a temperature between 110° C. and 250° C., preferably between 130° C. and 220° C., preferably at pressures of between 0.1 MPa and 7 MPa, preferably between 0.3 MPa and 6 MPa, preferably providing a specific energy of more than 0.1 kWh/kg during said extrusion. Destructuring of starch is preferably carried out in the presence of 1-40% by weight, with respect to the weight of starch, of one or more plasticisers selected from water and polyols having from 2 to 22 carbon atoms. As far as water is concerned, this may also be the water naturally present in the starch. Among the polyols, polyols having 1 to 20 hydroxyl groups containing 2 to 6 carbon atoms, their ethers, thioethers and organic and inorganic esters are preferred. Examples of polyols are glycerol, diglycerol, polyglycerol, pentaerythritol, polyglycerol ethoxylate, ethylene glycol, polyethylene glycol, 1,2-propanediol, 1,3-propanediol, 1,4-butanediol, neopentyl glycol, sorbitol, sorbitol monoacetate, sorbitol diacetate, sorbitol monoethoxylate, sorbitol diethoxylate, and mixtures thereof. In a preferred embodiment starch is destructured in the presence of glycerol or a mixture of plasticisers including glycerol, preferably comprising 1-90% by weight of glycerol. Preferably the destructured starch comprises 1-40% by weight, with respect to the weight of the starch, of plasticisers selected from those listed above. Compositions comprising destructured starch are particularly preferred. Preferably, starch in the mixture is present in the form of particles having a circular, elliptical or otherwise ellipse-like cross-section with an arithmetic mean diameter, measured taking into account the major axis of the particle, of less than 1 µm and more preferably less than 0.5 µm mean diameter. According to one aspect of the invention, layer (ii) comprises destructured starch in a complexed form with polymers containing hydrophilic groups intercalated with hydrophobic sequences such as the compositions described in patent application EP 2 758 465. These compositions may be applied in the form of aqueous dispersions; preferably they comprise, in relation to the total weight of the composition:
  30-80% destructured starch;
  20-70% of polymers containing hydrophilic groups intercalated with hydrophobic sequences;
  0-25% plasticisers;
  0-20% water.

According to this aspect, destructured starch in complex form means a destructured starch which in the X-ray spectrometer has one or more crystalline shapes that can be associated with one or more of the diffraction peaks listed below.

| Crystalline form | | |
|---|---|---|
| $VH_{(2\theta)}$ | $VA_{(2\theta)}$ | $EH_{(2\theta)}$ |
| 7.4 (±0.3) | 7.7 (±0.3) | 7.0 (±0.2) |
| 12.8 (±0.2) | 13.5 (±0.4) | 12.0 (±0.3) |
| 16.7 (±0.2) | 15.7 (±0.1) | 13.1 (±0.3) |
| 18.3 (±0.2) | 17.6 (±0.1) | 18.2 (±0.4) |
| 19.7 (±0.3) | 19.3 (±0.2) | 24.9 (±0.2) |
| 22.2 (±0.2) | 20.8 (±0.2) | |
| 24.9 (±0.2) | 23.7 (±0.1) | |
| | 26.4 (±0.1) | |
| | 27.5 (±0.1) | |
| | 28.6 (±0.1) | |

As regards the polymers containing hydrophilic groups intercalated with hydrophobic sequences, these are preferably insoluble in water. This reduces the water permeability of coating layer (ii) according to the present invention.

As regards the polymers containing hydrophilic groups intercalated with hydrophobic sequences, these are advantageously chosen from among:
  a. polyvinyl alcohol with a degree of hydrolysis of 10 to 100%;
  b. vinyl alcohol/vinyl acetate block copolymers;
  c. polyvinyl acetate in dry form and in the form emulsified in water;
  d. ethylene copolymers with vinyl alcohol, vinyl acetate, acrylic acid, methacrylic acid, crotonic acid, itaconic acid, maleic anhydride, glycidyl methacrylate and mixtures thereof;
  e. 6-6, 6-9 or 12 aliphatic polyamides, aliphatic polyurethanes, aliphatic and aliphatic/aromatic polyesters, random or block polyurethane/polyamide, polyurethane/polyether, polyurethane/polyester, polyamide/polyester, polyamide/polyether, polyester/polyether, polyurea/polyester, polyurea/polyether, polylactic acid, polyglycolic acid, polycaprolactone/urethane copolymers, where the molecular weight of polycaprolactone blocks is between 300 and 3000.

Mixtures of these polymers may also be used.

Of the polymers containing hydrophilic groups intercalated with hydrophobic sequences, those preferred are ethylene copolymers with vinyl alcohol and/or acrylic acid, polyvinyl alcohol with degrees of hydrolysis from 10 to 100%, polyvinyl acetates in dry form and emulsified in water, vinyl alcohol/vinyl acetate block copolymers and mixtures thereof.

Of these, polyvinyl alcohol and ethylene copolymers with vinyl alcohol and acrylic acid are particularly preferred.

In the case of ethylene copolymers with vinyl alcohol, these preferably contain 20-50% in moles of ethylene units.

In the case of ethylene copolymers with acrylic acid, these preferably contain 70-99% by weight of ethylene units.

This composition based on destructured and complexed starch is preferably deposited in the form of an aqueous dispersion.

As a result of the characteristics of the destructured and complexed starch composition described above, said layer (ii) demonstrates high barrier properties, e.g. to saturated and aromatic hydrocarbon compounds, making it particularly useful for packaging in the food sector.

This coating layer (ii) may be applied to film layer (i) using known techniques, e.g. techniques typically used in the painting and printing industry.

For example, application may take place in the molten state; alternatively the coating layer may be transferred to the surface to be coated in the form of a solution or dispersion in solvent, followed by evaporation of the solvent and solidification of the coating or lacquer, as is the case in coating processes, e.g. blade or film coating. In the latter case, an organic solvent or water is typically used.

Other application methods comprise transfer to the surface of the material to be coated by sublimation, e.g. under vacuum conditions or by electromagnetic processes.

Said application processes in solution or solvent dispersion form typically comprise a stage of deposition of a coating layer on one side of a substrate and a stage of drying of that substrate.

After deposition, the process may also advantageously comprise removal of part of the deposited coating composition from the substrate, allowing the thickness of the coating layer to be adjusted (known as levelling).

As far as the stage of drying the substrate is concerned, radiation systems, preferably infrared, convection systems, preferably hot air, or contact systems, preferably with drying cylinders, or any combination of these, may be advantageously used.

Preferably the film according to the invention is suitable for contact with foods.

The film according to the invention may take the form of a multi-layer film comprising at least one additional polymer layer (iii) adjacent to the first layer (i) described above.

Said polymer layer (iii) comprises for example polymers of natural origin (such as cellulose and its derivatives) or of synthetic origin.

Preferably it comprises, or advantageously consists of, one or more polymers selected from:
 a polyhydroxyalkanoate preferably selected from the group consisting of polyesters of lactic acid, poly-ε-caprolactone, polyhydroxybutyrate, polyhydroxybutyrate-valerate, polyhydroxybutyrate-propanoate, polyhydroxybutyrate-hexanoate, polyhydroxybutyrate-decanoate, polyhydroxybutyrate-dodecanoate, polyhydroxybutyrate-hexadecanoate, polyhydroxybutyrate-octadecanoate, poly3-hydroxybutyrate-4-hydroxybutyrate and mixtures thereof;
 an aliphatic/aromatic polyester of the diacid-diol type, the same as or different from those described above as components of layer (i);
 an aliphatic polyester, preferably selected from those described above as a component of layer (i) and having a melting point not exceeding 110° C.;
 and their mixtures.

The multilayer film according to the present invention can be produced according to any of the processes known to those skilled in the art, for example by means of coextrusion, lacquering/coating as well as lamination.

In a preferred embodiment the multilayer film according to the present invention may be obtained by a process of co-extruding layers (i) and (iii), followed by a stage of application of coating layer (ii).

Preferably said co-extrusion process is associated with a bubble film-forming process.

The equipment and specific process conditions, e.g. for co-extrusion and film-forming, for the production of multilayer film according to the present invention depend on the composition and number of layers in which the multilayer film is intended to be produced. The film according to the present invention may also be bonded to or laminated with layers of other materials such as paper. In this case, layer (i) is bonded to those materials preferably by extrusion coating and then coating layer (ii) is applied.

The present invention also relates to packaging obtained using film according to the present invention, for example in the form of bags, packaging, linings, caps or lids.

The invention will now be illustrated with a few example embodiments of implementation to be understood to be by way of example and without limiting the scope of protection of this patent application.

EXAMPLES

Example 1

Layer (i)

14.3 kg/h poly(butylene adipate-co-butylene terephthalate), MFR 4.2 g/10 min (190° C.; 2.16 kg) and acidity 42 meq/kg, 24.7 kg/h of Ingeo 3251D polylactic acid ("PLA"), MFR 40 g/10 min (190° C.; 2.16 kg), 1.0 kg/h masterbatch comprising 10% by weight of Joncryl ADR4368CS (styrene-glycidylether-methyl methacrylate copolymer) and Ingeo 4043D 90% polylactic acid ('PLA') were fed to an OMC-type twin-screw extruder operating under the following conditions:

Screw diameter (D)=58 mm;

L/D=36;

Rotation speed=140 rpm;

Thermal profile=60-150-180-210×4-180×2° C.;

Throughput=40 kg/h;

Vacuum degassing in zone 8 out of 10.

The granules thus obtained had an MFR value (190° C.; 2.16 kg according to ISO standard 1133-1 "Plastics—determination of the melt mass-flow rate (MFR) and melt volume flow rate (MVR) of thermoplastics—Part 1: Standard method") of 11.4 g/10 minutes. The granules so obtained were fed to a Ghioldi model bubble film machine with a 40 mm diameter screw with an L/D 30 operating at 64 rpm with a 120-200×3 thermal profile. The film-forming head with a 0.9 mm gap and L/D 12 was set at 200° C. Film-forming was performed with a blowing ratio of 3.2 and a stretch ratio of 11.7.

The film thus obtained (total 24 microns) was then characterised in terms of mechanical properties, in particular tensile strength ($\sigma_b$), elongation at break ($\varepsilon_b$), elastic modulus (E), optical properties (transmittance, haze and clarity) and roughness.

Roughness measurements were made on an area of 10 μm×10 μm through AFM operating in tapping mode with a resolution of 256 points by 256 lines, using a monolithic silicon microlever (cantilever) of length 225 microns, with a natural frequency of 190 kHz, force constant 48 N/m, tip radius less than 10 nm.

TABLE 1

Determination of the properties of layer (i) in Example 1

| | FILM TRACTION ASTM D882 (23° C. 50% RH - Vo 50 mm/min) | | | OPTICAL PROPERTIES ASTM D1003 | | | ROUGHNESS | |
|---|---|---|---|---|---|---|---|---|
| | $\sigma_b$ (MPa) | $\varepsilon_b$ (%) | E (MPa) | TRANS. (%) | HAZE (%) | CLARITY (%) | Sq (nm) | Sy (nm) |
| Ex. 1 | 37 | 314 | 2045 | 81 | 22 | 98 | 20.6 | 235.9 |

Layer (ii)

A complexed starch-based coating composition was prepared by feeding 19.8 kg/h native corn starch (containing 12% water), 12.9 kg/h polyvinyl alcohol with a degree of hydrolysis between 84.2% and 86.2%, 2.8 kg/h glycerine and 4.5 kg/h water to an OMC model twin-screw extruder operating under the following conditions:

Screw diameter (D)=58 mm;
L/D=36;
Rotation speed=140 rpm;
Thermal profile=145-170-200×4-150×2° C.;
Throughput=40 kg/h;
Vacuum degassing in zone 8 out of 10.

20 g of the product were added to 80 g of deionised water and dispersed by means of a rotor-stator disperser (Ika Ultra-Turrax T25) at 25000 rpm for 15 minutes. The suspension was allowed to cool to room temperature before being applied to the surface of layer (i) by airbrush with a 12 g/m² coating.

The film obtained visually appeared to demonstrate good adhesion between layer (i) and layer (ii).

The barrier properties of the film obtained were determined by permeability measurements performed in an Extrasolution Multiperm permeability meter at 23° C.-50% relative humidity, performed according to ASTM F2622-08 for oxygen and ASTM standard F2476-05 for carbon dioxide and are shown in Table 2.

TABLE 2

Determination of barrier properties of the film in Example 1

| Example 1 | P (O2) $\left[\dfrac{cm^3 \times mm}{m^2 \times 24\,h \times bar}\right]$ | $P_{(CO2)}$ $\left[\dfrac{cm^3 \times mm}{m^2 \times 24\,h \times bar}\right]$ |
|---|---|---|
| Layer (i) | 30.0 | 86.2 |
| Layer (i) + Layer (ii) | 2.7 | 14.0 |

It can be seen that the application of coating layer (ii) has resulted in a significant reduction in oxygen and $CO_2$ permeability, assuming a barrier film is obtained. This effect confirms the good adhesion between the two layers (i) and (ii).

Comparative Example 2

Layer (i)

An Ingeo™ Biopolymer 4043D polylactic acid (MFR (190° C., 2.16 kg) equal to 3 g/10 min) in granules was fed to a Ghioldi model bubble film-firming machine with a 40 mm diameter screw with an L/D 30 operating at 64 rpm with a 120-190×3° C. thermal profile. The film head had a 0.9 mm gap and the L/D 12 was set at 190° C. Film-forming was carried out with a blowing ratio of 3.2 and a stretch ratio of 8.1.

The film thus obtained (total 35 microns) was therefore characterised in terms of mechanical properties, in particular tensile strength ($\sigma_b$), elongation at break ($\varepsilon_b$) and elastic modulus (E), optical properties (transmittance, haze and clarity) and roughness, determined as in Example 1.

TABLE 3

Determination of the properties of layer (i) in comparative Example 2

| | FILM TRACTION ASTM D822 (23° C. 55% RH - Vo 50 mm/min) | | | OPTICAL PROPERTIES ASTM D1003 | | | ROUGHNESS | |
|---|---|---|---|---|---|---|---|---|
| | $\sigma_b$ (MPa) | $\varepsilon_b$ (%) | E (MPa) | TRANS. (%) | HAZE (%) | CLARITY (%) | Sq (nm) | Sy (nm) |
| Comp. Ex. 2 | 56 | 30 | 2983 | 95 | 2 | 99 | 9.2 | 89.3 |

As may be seen from Table 3, layer (i) obtained in Example 1 according to the invention has comparable mechanical and optical properties to those of layer (i) in Comparative Example 2 based only on PLA, and is suitable for packaging. In particular, layer (i) according to the invention has an elongation at break of a higher order of magnitude, denoting greater toughness.

At the same time layer (i) according to the invention has greater roughness in terms of both root mean square roughness Sq and the difference Sy between maximum peak and maximum trough with respect to the mean line.

Because of the lower surface roughness of PLA-only layer (i) in comparative example 2, application of a coating layer (ii) resulted in poorer adhesion.

Comparative Example 3

Layer (i)

16 kg/h poly(butylene sebacate-co-butylene-adipate-co-butylene terephthalate), MFR 5.7 g/10 min (190° C.: 2.16 kg) and acidity 25 meq/kg, 24 kg/h of Ingeo 4043D polylactic acid ("PLA"), MFR 3 g/10 min (190° C.: 2.16 kg), were fed to an OMC-type twin-screw extruder operating under the following conditions:
Screw diameter (D)=58 mm;
L/D=36;
Rotation speed=140 rpm;
Thermal profile=50-180-200×5-160×2° C.;
Throughput=40 kg/h;
Vacuum degassing in zone 8 out of 10.

The granules thus obtained had an MFR value (190° C.; 2.16 kg according to ISO standard 1133-1 "Plastics—determination of the melt mass-flow rate (MFR) and melt volume flow rate (MVR) of thermoplastics—Part 1: Standard method") of 5.9 g/10 minutes.

The granules so obtained were fed to a Ghioldi model bubble film machine with a 40 mm diameter screw with an L/D 30 operating at 64 rpm with a 120-145-180×2 thermal profile. The film-forming head with a 0.9 mm gap and L/D 12 was set at 180° C. Film-forming was performed with a blowing ratio of 3.2 and a stretch ratio of 12.5.

The film thus obtained (total 24 microns) was therefore characterised in terms of mechanical properties, in particular tensile strength ($\sigma_b$), elongation at break ($\varepsilon_b$) and elastic modulus (E), optical properties (transmittance, haze and clarity) and roughness, determined as in Example 1.

TABLE 4

Determination of the properties of layer (i) in comparative Example 3

| | FILM TRACTION ASTM D822 (23° C. 55% RH - Vo 50 mm/min) | | | OPTICAL PROPERTIES ASTM D1003 | | | ROUGHNESS | |
|---|---|---|---|---|---|---|---|---|
| | $\sigma_b$ (MPa) | $\varepsilon_b$ (%) | E (MPa) | TRANS. (%) | HAZE (%) | CLARITY (%) | Sq (nm) | Sy (nm) |
| Comp. Ex. 3 | 34 | 251 | 1594 | 85 | 25 | 75 | 64.6 | 378.8 |

Data in Table 4 show that the film layer (i) according to example 3 comparative, having a aliphatic-aromatic polyester to PLA molar ratio similar to the mixture of the film layer (i) of example 1 according to the invention but prepared in the absence of styrene-glycidylether-methyl methacrylate copolymer, is also characterized by good mechanical properties but has a much higher roughness, in terms of both root mean square roughness Sq and the difference Sy between maximum peak and maximum trough with respect to the mean line (see Table 1).

The excessive roughness value is to the detriment of the evenness of the coating layer, thus decreasing the barrier effect.

The invention claimed is:

1. A barrier film comprising at least one biodegradable layer (i) having an elastic modulus higher than 450 MPa, consisting of a mixture comprising a polyhydroxyalkanoate constituting the continuous phase and an aliphatic and/or aliphatic-aromatic polyester constituting the discontinuous phase, the said mixture further comprising from 0.01 to 5% wt. of a crosslinking agent and/or a chain extending agent having two or multiple functional groups, and at least one coating layer (ii), where the surface of layer (i) is characterised by a root mean square roughness Sq of more than 20 nm and less than 45 nm, measured by atomic force microscopy (AFM).

2. The barrier film according to claim 1, in which the said mixture comprises from 0.01 to 0.45% wt. of a crosslinking agent and/or a chain extending agent having two or multiple functional groups.

3. The barrier film according to claim 1 in which the said crosslinking agent and/or chain extending agent is selected from compounds having two or multiple functional groups including isocyanate, peroxide, carbodiimide, isocyanurate, oxazoline, epoxy, anhydride or divinyl ether groups and mixtures of these.

4. The barrier film according to claim 1 in which layer (i) has elongation at break (Eb) values of 150% or above and below 400% measured according to ASTM D882 (23° C., 50% relative humidity at Vo 50 mm/min).

5. The barrier film according to claim 1, in which said polyhydroxyalkanoate is selected from the group consisting of: polyesters of lactic acid, polyhydroxybutyrate, polyhydroxybutyrate-valerate, polyhydroxybutyrate-propanoate, polyhydroxybutyrate-hexanoate, polyhydroxybutyrate-decanoate, polyhydroxybutyrate-dodecanoate, polyhydroxybutyrate-hexadecanoate, polyhydroxybutyrate-octadecanoate, poly-3-hydroxybutyrate-4-hydroxybutyrate polyesters and mixtures thereof.

6. The barrier film according to claim 5, in which said polyhydroxyalkanoate comprises at least 70% by weight of one or more polyesters of lactic acid.

7. The barrier film according to claim 1, in which said aliphatic and/or aliphatic-aromatic polyester layer (i) is selected from the group consisting of poly(1,4-butylene succinate), poly(1,4-butylene succinate-co-adipate), poly(1,4-butylene succinato-co-1,4-butylene azelate), poly(1,4 butylene adipate-co-1,4-butylene terephthalate), poly(1,4-butylene succinate-co-1,4-butylene terephthalate), poly(1,4-butylene azelate-co-1,4-butylene terephthalate), poly(1,4-butylene brassylate-co-1,4-butylene terephthalate), poly(1,4-butylene sebacate-co-1,4-butylene terephthalate), poly(1,4-butylene adipate-co-1,4-butylene sebacate-co-1,4-butylene terephthalate), poly(1,4-butylene azelate-co-1,4-butylene sebacate-co-1,4-butylene terephthalate), poly(1,4-butylene adipate-co-1,4-butylene azelate-co-1,4-butylene terephthalate), poly(1,4-butylene succinate-co-1,4-butylene sebacate-co-1,4-butylene terephthalate), poly(1,4-butylene adipate-co-1,4-butylene succinate-co-1,4-butylene terephthalate), poly(1,4-butylene azelate-co-1,4-butylene succinate-co-1,4-butylene terephthalate).

8. The barrier film according to claim 1, in which said crosslinking agent and/or a chain extending agent having two or multiple functional groups bears peroxide groups and is contained in the film layer (i) in amounts from 0.01 to 0.1% by weight of the total mixture constituting layer (i).

9. The barrier film according to claim 1, in which said crosslinking agent and/or a chain extending agent having two or multiple functional groups bears epoxy groups and is contained in the film layer (i) in amounts from 0.05 to 0.3% by weight of the total mixture constituting layer (i).

10. The barrier film according to claim 1, in which said coating layer (ii) is capable of having barrier effects against gases and liquids.

11. The barrier film according to claim 1, in which said coating layer (ii) comprises a first layer of organic material, which may be natural and/or synthetic, in contact with said layer (i) and a second layer of metal material covering the first.

12. The barrier film according to claim 1, further including a polymer layer (iii) (multilayer film).

13. The barrier film according to claim 12, in which said layer (iii) comprises one or more polymers selected from: polyhydroxyalkanoate, aliphatic/aromatic polyester of the diacid-diol type which is the same as or different from those comprised in layer (i), aliphatic polyester, and mixtures thereof.

14. Food packaging comprising the barrier film according to claim 1.

15. Packaging having a barrier effect comprising a biodegradable film with a modulus of more than 450 MPa, consisting of a mixture comprising a polyhydroxyalkanoate as the continuous phase and at least one aliphatic and/or aliphatic-aromatic polyester as the discontinuous phase.

16. Packaging comprising a barrier film according to claim 1.

17. The barrier film according to claim 2 in which the said crosslinking agent and/or chain extending agent is selected from compounds having two or multiple functional groups including isocyanate, peroxide, carbodiimide, isocyanurate, oxazoline, epoxy, anhydride or divinyl ether groups and mixtures of these.

18. The barrier film according to claim 2 in which layer (i) has elongation at break (8b) values of 150% or above and below 400% measured according to ASTM D882 (23° C., 50% relative humidity at Vo 50 mm/min).

19. The barrier film according to claim 3 in which layer (i) has elongation at break (8b) values of 150% or above and below 400% measured according to ASTM D882 (23° C., 50% relative humidity at Vo 50 mm/min).

20. The barrier film according to claim 2, in which said polyhydroxyalkanoate is selected from the group consisting of: polyesters of lactic acid, polyhydroxybutyrate, polyhydroxybutyrate-valerate, polyhydroxybutyrate-propanoate, polyhydroxybutyrate-hexanoate, polyhydroxybutyrate-decanoate, polyhydroxybutyrate-dodecanoate, polyhydroxybutyrate-hexadecanoate, polyhydroxybutyrate-octadecanoate, poly-3-hydroxybutyrate-4-hydroxybutyrate polyesters and mixtures thereof.

21. The barrier film according to claim 1, wherein the root mean square roughness Sq is above 40 nm.

22. The barrier film according to claim 1, wherein the at least one biodegradable layer (i) having an elastic modulus higher than 450 MPa, consists of a mixture comprising from 90 to 51% by weight of a polyhydroxyalkanoate constituting the continuous phase and from 10 to 49% by weight of an aliphatic and/or aliphatic-aromatic polyester constituting the discontinuous phase.

23. The barrier film according to claim 22, wherein the root mean square roughness Sq is above 40 nm.

* * * * *